United States Patent
Liang et al.

(10) Patent No.: US 9,897,499 B2
(45) Date of Patent: Feb. 20, 2018

(54) PLANET GEAR TRAIN BASED TORQUE DETECTOR

(71) Applicants: PRODRIVES & MOTIONS CO., LTD., Taipei (TW); Chia-Sheng Liang, Taipei (TW)

(72) Inventors: Chia-Sheng Liang, Taipei (TW); Yuen-Yang Hu, Taipei (TW); Meng-Jen Chiu, Taipei (TW)

(73) Assignees: PRODRIVES & MOTIONS CO., LTD., Taipei (TW); Chia-Sheng Liang, Taipei (TW)

(*) Notice: Subject to any disclaimer, the term of this patent is extended or adjusted under 35 U.S.C. 154(b) by 0 days.

(21) Appl. No.: 15/271,220

(22) Filed: Sep. 20, 2016

(65) Prior Publication Data
US 2017/0184466 A1    Jun. 29, 2017

(30) Foreign Application Priority Data

Dec. 23, 2015   (TW) .............................. 104143291 A

(51) Int. Cl.
| G01L 3/02 | (2006.01) |
| G01L 3/10 | (2006.01) |
| F16H 1/28 | (2006.01) |
| F16H 57/08 | (2006.01) |

(52) U.S. Cl.
CPC ............... G01L 3/108 (2013.01); F16H 1/28 (2013.01); F16H 57/082 (2013.01)

(58) Field of Classification Search
CPC ........... G01L 3/108; F16H 1/28; F16H 57/082

USPC ...................................................... 73/862.31
See application file for complete search history.

(56) References Cited

U.S. PATENT DOCUMENTS

| 4,404,799 A | * | 9/1983 | Dudek | B25B 23/1456 |
| | | | | 173/219 |
| 4,515,026 A | * | 5/1985 | Perkins | F16H 37/12 |
| | | | | 475/151 |
| 5,172,774 A | | 12/1992 | Melrose | |
| 8,302,702 B2 | | 11/2012 | Hansson et al. | |
| 2002/0005316 A1 | * | 1/2002 | Tokumoto | B62D 5/0472 |
| | | | | 180/446 |
| 2010/0139432 A1 | | 6/2010 | Steckel et al. | |
| 2015/0135856 A1 | | 5/2015 | Kim et al. | |
| 2017/0097269 A1 | * | 4/2017 | Liang | G01L 3/108 |

FOREIGN PATENT DOCUMENTS

| TW | M417320 U1 | 12/2011 |
| TW | M451316 U1 | 4/2013 |

* cited by examiner

*Primary Examiner* — Max Noori
(74) *Attorney, Agent, or Firm* — Chun-Ming Smith

(57) ABSTRACT

A planet gear train based torque detector is provided with idler gears between an input shaft and an output shaft wherein a rotation of the input shaft rotates the idler gears which rotate the output shaft, and a force is applied to a tangent line between each idler gear and the input shaft; peripheral resilient members, each having a fixed first end and a second end for receiving force applied thereon by the revolution of idler gears; and at least one strain gauge, each attached on one resilient member for measuring a deformation at the resilient member due to the revolution of the idler gears. A torque between the input shaft and the output shaft is obtained by calculating the deformation. The resilient members parallel the input shaft.

19 Claims, 6 Drawing Sheets

(A-A)

(B-B)

(C-C)

PLANET GEAR TRAIN BASED TORQUE DETECTOR

BACKGROUND OF THE INVENTION

1. Technical Field

The invention relates to devices for monitoring stress and strain in rotating machineries and more particularly to a planet gear train based torque detector capable of measuring deformation of each resilient member and calculating torque output based on the deformations.

2. Related Art

Conventionally, a rotating machinery is equipped with a torque sensor for measuring torque output. However, how to precisely measure torque output and mount a torque sensor in a limited space of the machinery is an issue to be addressed. Many patent literatures are disclosed for solving the issue. For example, U.S. Pat. Nos. 5,172,774 and 8,302,702; U.S. Publication Numbers 20100139432 and 20150135856; and Taiwan Utility Model Numbers M451,316 and M417,320 all disclose a strain gauge type sensing device for measuring torque output of a rotating machinery.

A typical strain gauge is a thin metal strip formed of metal wires having both ends attached to a torque responsive signal processing device. The strain gauge is mounted on a part of a rotating machinery. Resistance of the strain gauge may change in response to deformation formed on the part of the rotating machinery. Value of the torque can be determined based on the resistance change.

However, the torque sensing structure and its strain gauge attaching position is not ideal to detect the strain transferred from applied torque, at the meantime there exists a problem of oversized structure space. For example, U.S. Pat. No. 5,172,774 discloses a plurality of strain gauges arranged on a plurality of shear webs of a torque transmitting gear. Torque transmitted along the gear teeth can cause deformation of each shear web. However, the measured strain is the combination of normal strain and shear strain. Thus, torque applied on the gear cannot be correctly determined by measuring deformations of the shear webs. Thus, its torque measurement is not correct. More strain gauges are needed to measure normal and shear strains in order to increase correctness of the measurement. However, it can adversely increase the cost and the complexity. Further, a distance between the shear web mounted with the strain gauge and a center of the gear should be long enough in order to correctly measure normal and shear strains. However, it adversely increases size.

U.S. Publication No. 20100139432 discloses a transducer mounted on a housing and co-axially fixed to an axle. The transducer is shaped as a disc and has a hub co-axially fixed to the axle. The hub has a plurality of webs on a periphery. At least one strain gauge is attached on a hub of the disc mentioned before for measuring torque of the rotating axle. However, the disc has a low efficiency in transferring torque. That is, the force on the webs caused by the torque is distributed to all area of the disc. Thus, less deformation of the strain gauge is generated by the force. As a result, its torque measurement is not accurate. Further, it is not easy to reduce the size at radial direction.

U.S. Pat. No. 8,302,702 discloses attaching a strain gauge on a torque transferring element, and a ring gear mounted on a center of the torque transferring element for measuring torque of the ring gear by using the strain gauge. Torque is transferred from the center of the ring gear to the torque transferring element having the strain gauge attached. Thus, a bending moment is applied to an edge rib of the torque transferring element having the strain gauge attached. However, its torque measurement is not accurate due to the existence of the bending torque. Further, it is not easy to reduce the size at radial direction.

U.S. Publication No. 20150135856 discloses a force or torque sensor for measuring force or torque generated when a moving member encounters obstacles as a means of safety. The force or torque sensor also forms a hub coaxially connecting to a rotational element. Rims are provided on edge of the hub. A plurality of beams are provided on the edge of the rim and radial locations between the edge of the hub and the rim. A strain gauge is provided on each beam. Load on the beam is a bending load which can be expressed as a compressional force or tensional force. The strain gauge can sense strain formed on the beam, thereby measuring the force or torque. Above arrangement is not fully disclosed by the publication. Further, the provision of the strain gauge on each beam, for the purpose of increasing measurement correctness, greatly increases the structural complexity and is not economical. Further, it is not easy to reduce the size at radial direction.

Taiwan Utility Model Numbers M451316 and M417320 both disclose mounting a sleeve on a crank arm, and a strain gauge on the sleeve for measuring strain of the sleeve when torque is applied thereon. The strain is converted into a digital signal representing the strain and the signal is sent to an electric motor to control its output. It has the benefit of decreased size. However, additional devices such as a transformer and a wireless signal transmitter are required to be incorporated into the arrangement because the strain gauge is mounted on the moving device (sleeve). This adversely increases the structure size.

Notwithstanding the prior art, the invention is neither taught nor rendered obvious thereby.

BRIEF SUMMARY

It is desirable to provide an improved planet gear train based torque detector for eliminating drawbacks of conventional torque sensors such as low precision, low sensitivity, and large radial size.

It is therefore an object of the invention to provide a torque detector, comprising an input shaft; an output shaft; a plurality of idler gears disposed between the input shaft and the output shaft wherein a rotation of the input shaft rotates the idler gears which rotate the output shaft, and a force is applied to a tangent line between each idler gear and the input shaft; a plurality of peripheral resilient members, each having a fixed first end and a second end for receiving force applied thereon by the rotating idler gears; and at least one strain gauge, each disposed on one of the resilient members for measuring a deformation of the second end of each resilient member due to the rotation of the idler gears; wherein a torque between the input shaft and the output shaft is obtained based on the deformation; and wherein the resilient members parallel the input shaft longitudinally.

Preferably, further comprises a driven ring with the first ends of the resilient members fixed thereto, the driven ring is rotated on an axis thereof by the resilient members, thereby causing the deformation between the first and the second end of the resilient member.

Preferably, the driven part includes a plurality of spaced grooves on a surface thereof, each for slidably or securely receiving the second end of the resilient member.

Preferably, further comprises a fastening part for securing the first ends of the resilient members, and the fastening part is spaced apart from the driven part along the axis of the driven part.

Preferably, the resilient members are spaced apart with an axis of the input shaft passing through a center of the resilient members.

Preferably, at least one strain gauge is adjacent to the fastening part.

Preferably, the number of the at least one strain gauge is two, and the two strain gauges are disposed on two opposite surfaces of the resilient member.

Preferably, further comprises a planet gear train including a sun gear coaxially fixed to an end of the input shaft and configured to be an input, and a ring gear meshing the output shaft and configured to be an output, and each of the idler gears is a planet gear meshing both the sun gear and the ring gear.

Preferably, the sun gear meshes the output shaft and is configured to be an output, and the ring gear meshes the input shaft and is configured to be an input.

Preferably, further comprises a driven part with the planetary carrier secured thereto, and the rotation of the input shaft rotates the planet gears and rotates the driven part with planetary carrier secured thereto on an axis thereof so that the force is configured to transmit from the driven part to the resilient members to deform the resilient members.

Preferably, further comprises a fastening part for securing the first ends of the resilient members, the fastening part is spaced apart from the driven part along the axis of the driven part, and the resilient members are spaced apart with an axis of the sun gear and an axis of the ring gear both passing through a center of the resilient members.

Preferably, the fastening part includes an axial channel, the driven part includes an axial channel, and the input shaft passes through both the axial channel of the fastening part and the axial channel of the driven part to cause the sun gear to mesh the planet gears.

Preferably, the input shaft meshes at least one of the driven part and the fastening part.

By utilizing the invention, the following advantages are obtained.

Force transmitted from the rotating sun gear at an end of the input shaft is applied to a tangent line of the sun gear contacting each planet gear (i.e., each idler gear). The force is further applied to a ring gear at an end of an output shaft via the planet gears. The force is applied to a periphery of each planet gear, thereby deforming the resilient members and a torque between the input shaft and the output shaft is obtained by calculating the deformation. The torque measurement is precise.

A plurality of peripheral resilient members are provided and each has a fixed first end and a second end for receiving force applied thereon by the rotating idler gears. At least one strain gauge is provided and each is attached on one resilient member for measuring a deformation of each resilient member due to the loaded torque on the fastening part. A precise measurement of the torque can be carried out by calculating the deformation.

The resilient members are in parallel with the input shaft, the central axis of sun gear, or the ring gear so as to reduce size of the torque detector.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
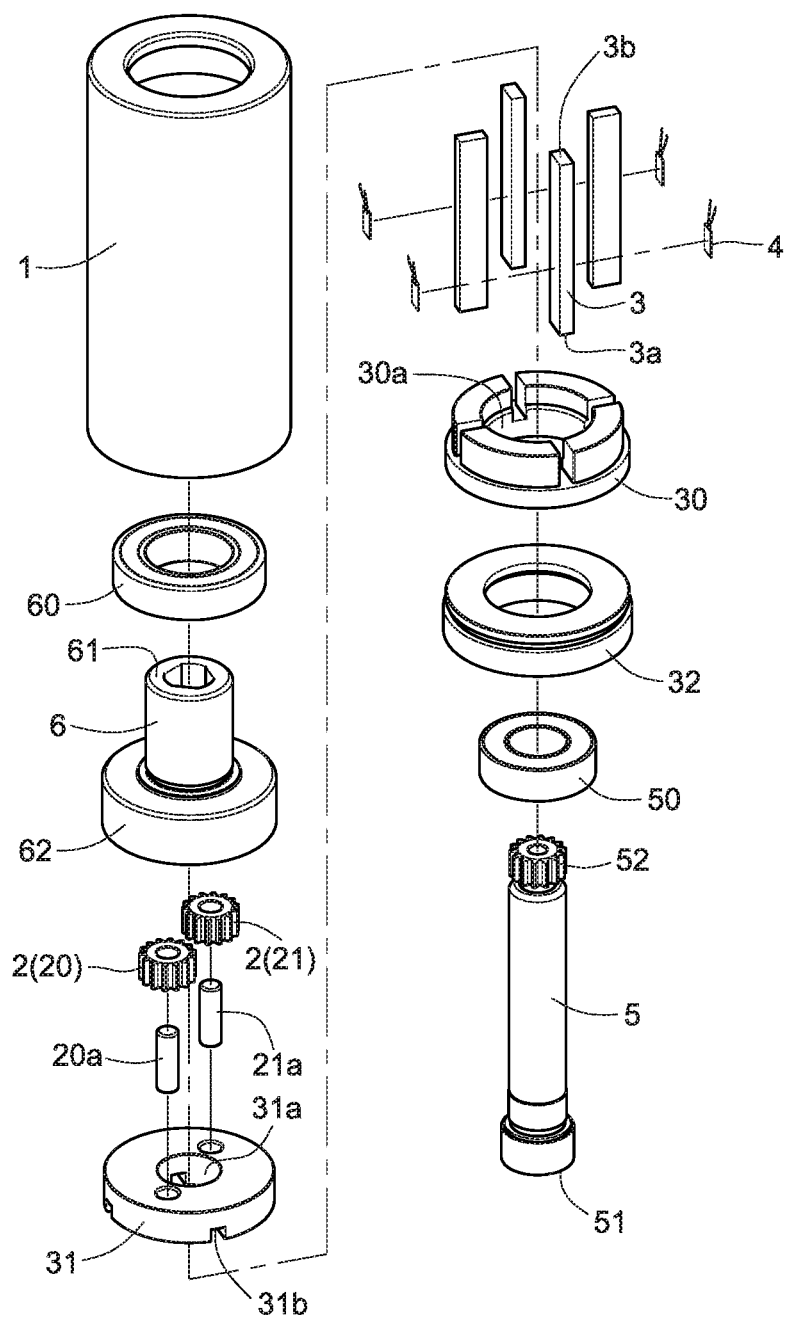
FIG. 1 is an exploded view of a planet gear train based torque detector according to the invention.

Referring to FIGS. 1 to 11, a planet gear train based torque detector in accordance with the invention comprises two idler gears 2, a plurality of (e.g., four) resilient members 3, four strain gauges 4, an input shaft 5, and an output shaft 6. The idler gears 2 are disposed between the input shaft 5 and the output shaft 6 (see FIGS. 1 and 2). Also, the idler gears 2, the input shaft 5 and the output shaft 6 are enclosed by a housing 1 which is a fixed end of the torque detector with both the input shaft 5 and the output shaft 6 coaxially connected thereto. A first bearing 50 is provided in the housing 1 to coaxially connect the input shaft 5, and a second bearing 60 is provided in the housing 1 to coaxially connect the output shaft 6. Further, on end 51 of the first bearing 50 is protrude to the housing 1 and one end 61 of the second bearing 60 is protrude to the housing 1.

Figure 3:
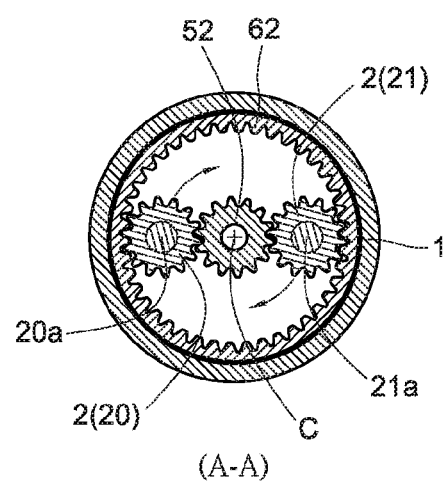
FIG. 3 is a sectional view taken along line A-A of FIG. 2.

Details of the idler gears 2, the input shaft 5 and the output shaft 6 are described in conjunction with FIG. 3. A planetary gear train is taken as an exemplary example of the invention. The planetary gear train is disposed in the housing 1 and the idler gears 2, the input shaft 5 and the output shaft 6 are components of the planetary gear train. One end 51 of the first bearing 50 is protrude to the housing 1 and the other end is in the housing 1 with a sun gear 52 coaxially fixed thereat. The output shaft 6 includes a ring gear 62 at the other end, the ring gear 62 meshing opposite first and second planet gears 20, 21 which in turn mesh the sun gear 52. The output shaft 6 and the ring gear 62 are formed integrally. The input shaft 5 is axially aligned with and spaced apart from the output shaft 6. In alternative arrangement of the invention, the input shaft 5 meshes the ring gear 62, and the output shaft 6 meshes the sun gear 52. Thus, input and output be changed.

The idler gear 2 can be implemented as two planet gears 20, 21. The planet gears 20, 21 mesh the sun gear 52 and the ring gear 62. Thus, the planet gears 20, 21, driven by the sun gear 52 or the ring gear 62, can rotate about an axis C of the input shaft 5, the sun gear 52, or the ring gear 62 (see FIGS. 2 and 3).

Figure 2:
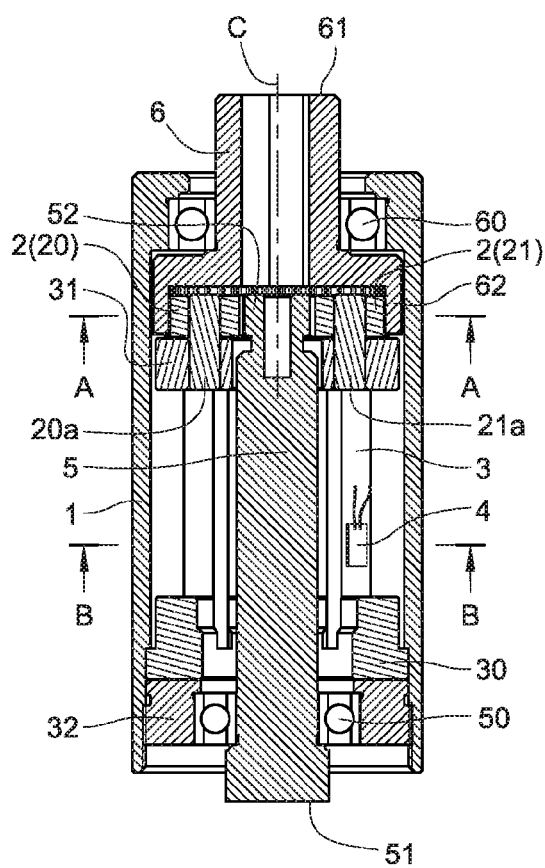
FIG. 2 is a longitudinal sectional view of the assembled torque detector.

As shown in FIGS. 1 and 2, the first and second planet gears 20, 21 are coaxially connected on a driven part 31. Specifically, the first planet gear 20 is coaxially connected to an axis 20a on the driven part 31 and the second planet gear 21 is coaxially connected to an axis 21a on the driven part 31. Thus, the first planet gear 20 may rotate about the axis 20a and the second planet gear 21 may rotate about the axis 21a respectively. Thus, the first and second planet gears 20, 21, driven by the sun gear 52 or the ring gear 62, can rotate about the axis C and further driving the driven part 31 to rotate.

Figure 4:
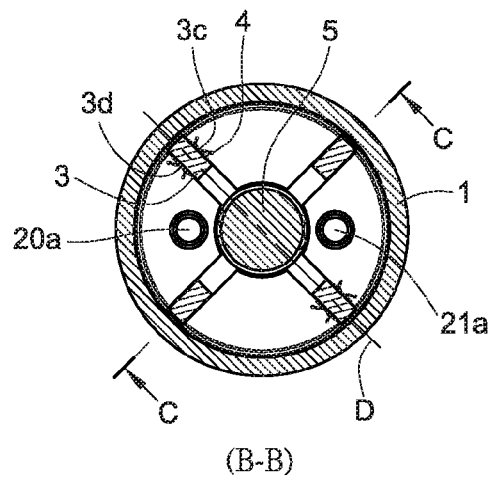
FIG. 4 is a sectional view taken along line B-B of FIG. 2.
Figure 5:
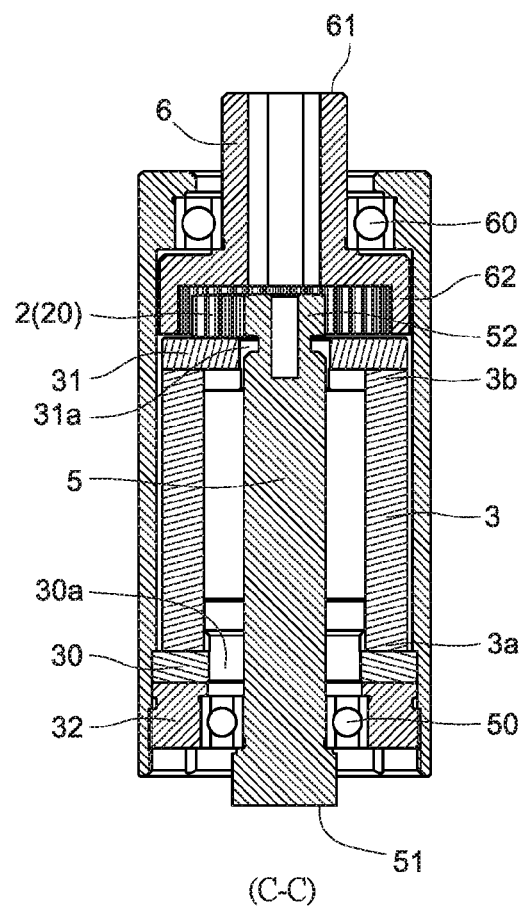
FIG. 5 is a sectional view taken along line C-C of FIG. 4.
Figure 6:
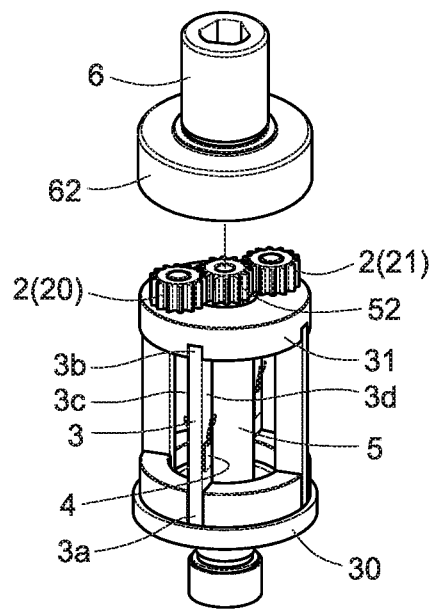
FIG. 6 is an exploded, perspective view of the components of FIG. 1 except the second bearing and the housing.
Figure 7:
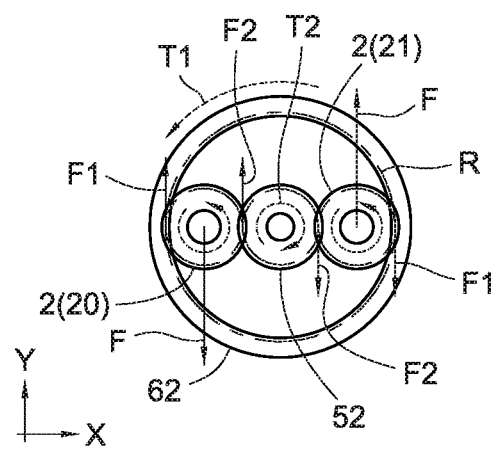
FIG. 7 schematically depicts different forces and torques applied on the components of FIG. 3.

As shown in FIGS. 5 and 6, the resilient members 3 are flat strips or plates. At least one of the resilient members attached with at least one strain gauge on the surface. Whenever the number of strain gauge attached is two, the strain gauges can be attached on the first surface 3c and the second surface 3d. The resilient members 3 are made of metal (e.g., carbon steel) and are flat plates. Cross-sections of each resilient member 3 can be the same or gradually changed. Thus, force can be applied on the resilient members 3 to cause deformation which can be measured by the strain gauge 4. The resilient member 3 has a fixed first end 3a and a second end 3b with force F applied thereon by the first and second planet gears 20, 21. Specifically, the first end 3a is secured to the fastening part 30 which is in turn secured to a base 32. The fastening of the first end 3a and the fastening part 30 is done by threading, welding, pins, or being formed integrally, and the fastening of the fastening part 30 and the base 32 is done by threading, welding, pins, or being formed integrally. The resilient members 3, the fastening part 30 and the base 32 are in the housing 1 which is a fixed end of the torque detector. The fastening part 30 and the driven part 31 are spaced apart and the axis C passes through centers of the fastening part 30 and the driven part 31. A plurality of (four) equally spaced grooves 31b are formed on a bottom of the driven part 31. The number of the grooves 31b is equal to that of the resilient members 3. Alternatively, the number of the grooves 31b is greater than that of the resilient members 3. Thus, the second ends 3b of the resilient members 3 are configured to slidably (or securely) dispose in the grooves 31b for receiving force F applied thereon by the first and second planet gears 20, 21. The resilient members 3 are in parallel with the input shaft 5. An axial channel 30a is formed through the fastening part 30, an axial channel 31a is formed through the driven part 31, and an axial channel (not numbered) is formed through the base 32. The input shaft 5 may pass through the axial channels 30a, 31a with the fastening part 30 and the driven part 31 disposed apart on the input shaft 5. After passing through fastening part 30 and the driven part 31, the input shaft 5 mesh the sun gear 52. Specifically, the resilient members 3 are disposed between the fastening part 30 and the driven part 31. As shown in FIG. 4, the resilient members 3 are at two ends of a transverse line D passing through the input shaft 5 (or the sun gear 52).

As shown in FIGS. 5 and 6, the sun gear 52 is torque input and clockwise rotates to counterclockwise rotate both the first and second planet gears 20, 21. The ring gear 62, driven by the first and second planet gears 20, 21, counterclockwise rotates as torque output. The ring gear 62 is required to overcome the torque T1. Torque T2 is applied to the sun gear 52. Torque obtained by multiplying T2 and reduction ratio should be equal to torque T1 in order to reach equilibrium. Force F2 is applied to a tangent line of the sun gear 52 contacting the first planet gear 20 (or the second planet gear 21). Also, force F1 is applied to a tangent line of the ring gear 62 contacting the first planet gear 20 (or the second planet gear 21). The force F1 parallels the force F2. F=F1+F2 and F1=F2=F/2 if equilibrium occurs. Thus, the resultant force (i.e., F1+F2) along the tangent line is force F which is applied to a periphery of each of the first and second planet gears 20, 21 about the axis C, thereby generating torque when the first and second planet gears 20, 21 rotate. Specifically, each of the first and second planet gears 20, 21 may rotate on its axis due to the constrain of the driven part 31. The force F applied to the periphery of each of the first and second planet gears 20, 21 may cause rotation of the driven part 31 on the axis C due to rotation of the first planet gear 20 on its axis 20a and rotation of the second planet gear 21 on its axis 21a. More specifically, the driven part 31 may rotate slightly on the axis C and the slight rotation of the driven ring 31 causes deformation of each the resilient member 3. That is, the resilient member 3 is deformed due to the force F. Each resilient member 3 is deformed in response to the force F applied to the periphery of each of the first and second planet gears 20, 21 and transfer of the force F to the driven part 31. Radius of the ring gear 62 is R. Thus, T1=2× (F1×R) and F1=T1/(2×R). It is noted that reverse of the function of the sun gear 52 as input and the ring gear 62 as output does not affect the application that force applied will cause the deformation of the resilient members 3.

Figure 8A:
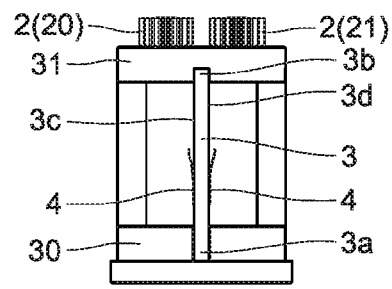
FIG. 8a schematically depicts the resilient member secured to the fastening part.
Figure 8B:
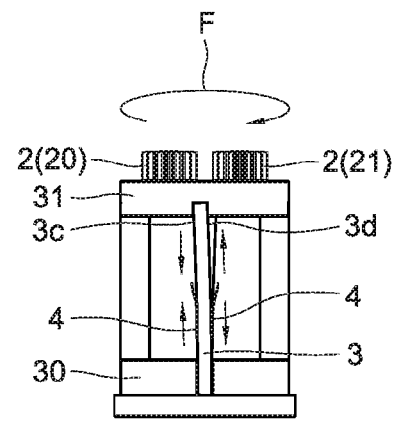
FIG. 8b is a view similar to FIG. 8a showing a bending deformation of the resilient member due to rotation of the fastening part.

As shown in FIGS. 8a and 8b, the first end 3a of each resilient member 3 is secured to the fastening part 30 (see FIG. 8a). Also, the second end 3b of each resilient member 3 is configured to slidably dispose in the grooves 31b of the driven part 31 or the second end 3b of each member 3 is integrally formed with the grooves 31b of the driven part 31. The driven part 31 may rotate slightly on the axis C and the slight rotation of the driven part 31 causes deformation of the second end 3b of each the resilient member 3. It is noted that the first end 3a of the resilient member 3 is fixed. Thus, each resilient member 3 is deformed (i.e., bent). As such, compressional force is exerted on the first surface 3c and tensile force is exerted on the second surface 3d. Thus, the strain gauge 4 on each resilient member 3 may measure strain caused by the deformation of the resilient member 3. The measured strain is taken as torque between the input shaft 5 and the output shaft 6. Alternatively, the second end 3b of each resilient member 3 is fastened in the grooves 31b or integrally formed with the grooves 31b of the driven part 31. The driven part 31 may rotate slightly on the axis C and the slight rotation of the driven ring 31 causes deformation of the second end 3b of each the resilient member 3. The strain gauge 4 may measure strain caused by the deformation of the resilient member 3. The measured strain is taken as torque between the input shaft 5 and the output shaft 6.

Figure 9:
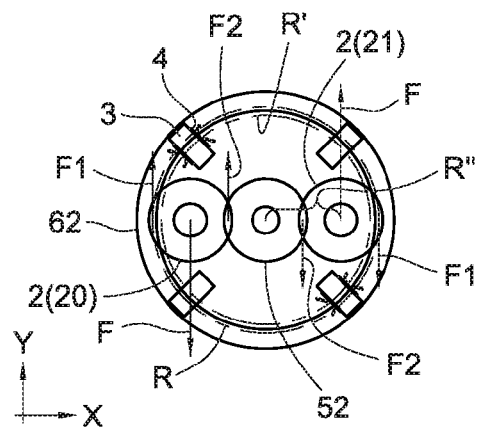
FIG. 9 schematically depicts different forces and torques applied on the components of FIG. 4.
Figure 10A:
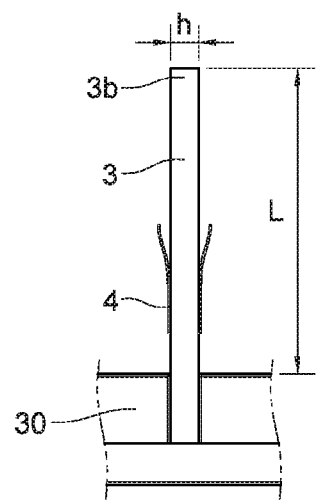
FIG. 10a is a front view of the resilient member.
Figure 10B:
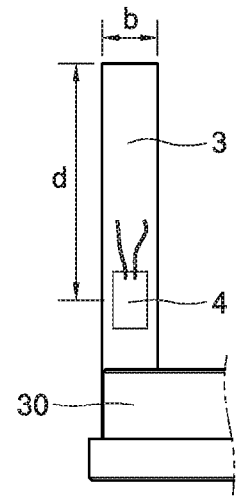
FIG. 10b is a side view of the resilient member.

As shown in FIG. 9, an exemplary example regarding force applied on the resilient member 3 and torque caused by the force is explained below. Torque T1 of the ring gear 62 is 2.5N–m, radius R of the ring gear 62 is 10.5 mm, and force applied on a tangent line of each of the first and second planet gears 20, 21 is F1. Thus, $$T1=2\times(F1\times R);$$

$$F1=T1/(2\times R)=2.5/(2\times 0.0105)=119.0476N=12.1394 \text{ (kgf)}$$

where a distance R1 from a center of the resilient member 3 to an axis of the sun gear 52 is 9.75 mm, and a distance R" from an axis of each of the first and second planet gears 20, 21 to the axis of the sun gear 52 is 7.15 mm. Force F applied on the periphery of each of the first and second planet gears 20, 21 may slightly rotate the driven part 31 to deform the resilient members 3. Specifically, force is F', the number of the resilient members 3 is four, and $2\times(F\times R'')=4\times(F'\times R')$ and thus the following expression can be obtained:

$$F'=(R''/R')\times(F/2)=(7.15/9.75)\times12.1394=8.9022 \text{ (kgf)}$$

The material of the resilient members 3 is JIS SK7 having a tensile strength of about 176 kgf/mm$^2$, a yield strength of about 158.362 kgf/mm$^2$, and a Young's modulus E of about 21,000 kgf/mm$^2$.

Stress σ is less than half of the tensile strength 158.362 kgf/mm$^2$. It is confirmed that each resilient member 3 is in compliance with the useful life requirement.

Figure 11:
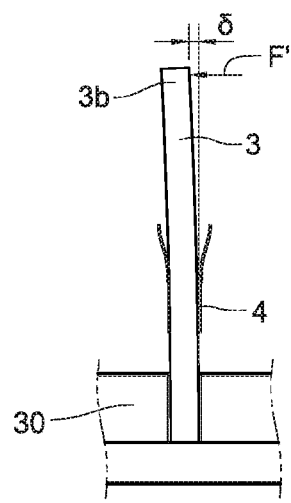
FIG. 11 is a view similar to FIG. 10a showing a bending deformation of the resilient member in response to force applied thereon.

As shown in FIG. 11, deflection δ of the second end 3b of each resilient member 3 in response to force F applied on the resilient member 3 is expressed below.

$$\delta=4\times L^3\times F'/(b\times h^3\times E)=4\times20^3\times 8.9022/(4\times 2^3\times 21000)=0.4239 \text{ (mm)}$$

The strain gauge 4 is located at a distance d of 15 mm from an end of the resilient member 3. Thus, bending moment M is expressed below.

$$M=F'\times d=8.9022\times 15=133.533 (\text{kgf}\cdot\text{mm})$$

Area Moment of Inertia I is expressed below.

$$I=b\times h^3/12=4\times 2^3/12=2.6667 \text{ (mm)}$$

Curvature radius r is expressed below.

$$r=(M/E\times I)-1=(133.533/21000\times 2.6667)-1=419.377 \text{ (mm)}$$

Strain ε is expressed below.

$$\epsilon=(2\pi(r+0.5h)-2\pi r)/2\pi r=h/2r=2/(2\times 419.377)=0.002384=2.384\times 10^{-3}$$

where the distance d depends on convenience of assembly and the maximum bending moment. For example, the strain gauge 4 on the resilient member 3 is proximate the fastening ring 30 (i.e., distal the driven ring 31) so as to increase strain and enable a precise measurement of the torque.

In view of above description, one end of each resilient member 3 is adapted to bend or deform in response to a twisting force exerted thereon. And in turn, the strain gauge 4 can precisely measure strain caused by the bending or deformation. Thus, a precise torque is obtained. The resilient members 3 are longitudinally in parallel with the input shaft 5, the sun gear 52, or the ring gear 62 rather than arranged radially with respect to the input shaft 5, the sun gear 52, or the ring gear 62. Thus, radial size of the torque detector of invention is greatly decreased in comparison with that of the torque sensor of the prior art.

Regarding arrangement of the first and second planet gears 20, 21 (i.e., idler gears 2), the input shaft 5 and the output shaft 6, the only requirements are below. The input shaft 5 can rotate both the idler gears 2 to cause the rotating central axes of which rotate about the axis C due to the resultant force F on the tangent line on the periphery of each idler gear 2. Further, the output shaft 6 is driven by the idler gears 2. It is noted that the idler gears 2 may be not planet gears in other embodiments.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A torque detector, comprising:
   an input shaft;
   an output shaft;
   a plurality of idler gears disposed between the input shaft and the output shaft wherein a rotation of the input shaft drives each idler gear to rotate about a central axis thereof and revolute on the periphery about input shaft axis which drives the output shaft to rotate, and a reaction force is applied to a tangent line as the loaded torque when the idler gears revolute on the periphery about the input shaft axis;
   a plurality of resilient members, each having a fixed first end and a second end for receiving force applied thereon by the revolution of idler gears on the periphery mentioned;
   a driven part, the plurality of idler gears disposing on a first side of the driven part; and
   at least one strain gauge, each attached on one of the resilient members for measuring a deformation of each resilient member due to the revolution of the idler gears;
   wherein a torque between the input shaft and the output shaft is obtained based on the bending deformation of the resilient members;
   wherein the resilient members parallel the input shaft longitudinally; and
   wherein the plurality of resilient members are fixed to a second side of the driven part along an axial direction of the idler gears, wherein the first side is opposite to the second side.

2. The torque detector of claim 1, wherein the first ends of the resilient members are secured to the driven part, and wherein the driven part is rotated on an axis thereof by the revolution of the idler gears caused by the reaction forces applied on the tangent line of idler gears, thereby causing the deformation of the resilient members.

3. The torque detector of claim 2, wherein the driven part includes a plurality of spaced grooves on a surface thereof, each for slidably receiving the second end of the resilient member.

4. The torque detector of claim 2, wherein the driven part includes a plurality of spaced grooves on a surface thereof, each for securely receiving the second end of the resilient member.

5. The torque detector of claim 2, further comprising a fastening part for securing the first ends of the resilient members, and wherein the fastening part is spaced apart from the driven part along the axis of the driven part.

6. The torque detector of claim 1, wherein the resilient members are spaced apart at the radial line about the axis of the input shaft passing through the central axis.

7. The torque detector of claim 5, wherein each of the at least one strain gauge is adjacent to the fastening part.

8. The torque detector of claim 1, wherein the number of the at least one strain gauge is two, and the two strain gauges are disposed on two opposite surfaces of the resilient member respectively.

9. The torque detector of claim 1, further comprising a planet gear train including a sun gear coaxially fixed at an end of the input shaft and configured to be an input, and a ring gear meshing the output shaft and configured to be an output, and wherein each of the idler gears is a planet gear meshing both the sun gear and the ring gear.

10. The torque detector of claim 9, wherein the sun gear meshes the output shaft and is configured to be an output, and the ring gear meshes the input shaft and is configured to be an input.

11. The torque detector of claim 9, further comprising a driven part with the planet gear train secured thereto, and wherein the rotation of the input shaft rotates the planet gears and the planet gears revolute on the periphery about the central axis and drive the driven part to rotate about an axis thereof so that the force is configured to transmit from the driven part to the resilient members to deform the resilient members.

12. The torque detector of claim 11, wherein the driven part includes a plurality of spaced grooves on a surface thereof, each for slidably receiving the second end of the resilient member.

13. The torque detector of claim 11, wherein the driven part includes a plurality of spaced grooves on a surface thereof, each for securely or integrally receiving the second end of the resilient member.

14. The torque detector of claim 11, further comprising a fastening part for securing the first ends of the resilient members, wherein the fastening part is spaced apart from the driven part along the axis of the driven part, and wherein the resilient members are spaced apart at the radial line about the axis of the sun gear and the ring gear.

15. The torque detector of claim 14, wherein the number of the at least one strain gauge is two, and the two strain gauges are attached on two opposite surfaces of the resilient member respectively.

16. The torque detector of claim 14, wherein each of the at least one strain gauge is adjacent to the fastening part.

17. The torque detector of claim 14, wherein the fastening part includes an axial channel, the driven part includes an axial channel, and the input shaft passes through both the axial channel of the fastening part and the axial channel of the driven part to cause the sun gear to mesh the planet gears.

18. The torque detector of claim 17, wherein the input shaft coaxially connect to least one of the driven part and the fastening part.

19. A torque detector, comprising:
- an input shaft;
- an output shaft;
- a plurality of idler gears disposed between the input shaft and the output shaft wherein a rotation of the input shaft drives each idler gear to rotate about a central axis thereof and revolute on the periphery about input shaft axis which drives the output shaft to rotate, and a reaction force is applied to a tangent line as the loaded torque when the idler gears revolute on the periphery about the input shaft axis;
- a plurality of resilient members, each having a fixed first end and a second end for receiving force applied thereon by the revolution of idler gears on the periphery mentioned;
- a driven part with the first ends of the resilient members secured thereto, the driven part including a plurality of spaced grooves on a surface thereof, each of the spaced grooves slidably receiving the second end of the resilient member;
- at least one strain gauge, each attached on one of the resilient members for measuring a deformation of each resilient member due to the revolution of the idler gears;
- wherein a torque between the input shaft and the output shaft is obtained based on the bending deformation of the resilient members;
- wherein the resilient members parallel the input shaft longitudinally; and
- wherein the driven part is rotated on an axis thereof by the revolution of the idler gears caused by the reaction forces applied on the tangent line of idler gears, thereby causing the deformation of the resilient members.

* * * * *